United States Patent
Liang et al.

(10) Patent No.: US 12,483,886 B2
(45) Date of Patent: Nov. 25, 2025

(54) DEVICE AUTHENTICATION METHOD AND APPARATUS

(71) Applicant: DATANG MOBILE COMMUNICATIONS EQUIPMENT CO., LTD., Beijing (CN)

(72) Inventors: Yacong Liang, Beijing (CN); Hui Xu, Beijing (CN); Wei Zhou, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/711,572

(22) PCT Filed: Nov. 21, 2022

(86) PCT No.: PCT/CN2022/133205
§ 371 (c)(1),
(2) Date: May 17, 2024

(87) PCT Pub. No.: WO2023/093668
PCT Pub. Date: Jun. 1, 2023

(65) Prior Publication Data
US 2024/0422536 A1 Dec. 19, 2024

(30) Foreign Application Priority Data
Nov. 23, 2021 (CN) .......................... 202111392897.3

(51) Int. Cl.
*H04W 12/06* (2021.01)
*H04W 12/61* (2021.01)
*H04W 36/08* (2009.01)

(52) U.S. Cl.
CPC ........... *H04W 12/06* (2013.01); *H04W 12/61* (2021.01); *H04W 36/08* (2013.01)

(58) Field of Classification Search
CPC ... H04W 12/06; H04W 12/61; H04W 12/069; H04W 12/08; H04W 36/08; H04W 88/10
See application file for complete search history.

(56) References Cited

U.S. PATENT DOCUMENTS 6,370,380 B1   4/2002  Norefors et al.
10,327,185 B2* 6/2019  Agarwal .............. H04W 76/27
(Continued)

FOREIGN PATENT DOCUMENTS

CN   102415153 A   4/2012
CN   105451250 A   3/2016
(Continued)

OTHER PUBLICATIONS

International Search Report in International Application No. PCT/CN2022/133205, mailed on Feb. 20, 2023, with English machine translation provided by WIPO.
(Continued)

Primary Examiner — Khawar Iqbal
(74) Attorney, Agent, or Firm — Ladas & Parry, LLP

(57) ABSTRACT

A device authentication method and an apparatus are provided, to solve the problem of how to perform an authentication for the device in a UUDN. The method includes: obtaining, by a target access point (AP), a first timestamp sent by a local service center (LSC) device and a second timestamp sent by a terminal, where the second timestamp is sent by the LSC device to the terminal, and the first timestamp and the second timestamp are sent by the LSC device based on an AP switching event; when the first timestamp is consistent with the second timestamp, determining, by the target AP, that the terminal is an access terminal of the target AP.

11 Claims, 7 Drawing Sheets

(56) References Cited

U.S. PATENT DOCUMENTS

| | | | |
|---|---|---|---|
| 11,051,126 B2* | 6/2021 | Biehl | H04W 12/61 |
| 11,737,003 B2* | 8/2023 | Wang | H04W 36/00222 |
| | | | 370/331 |
| 12,022,517 B2* | 6/2024 | Xu | H04W 74/006 |
| 12,192,132 B2* | 1/2025 | Guo | H04W 52/325 |
| 2008/0134306 A1 | 6/2008 | Krishnan | |
| 2009/0187983 A1 | 7/2009 | Zerfos et al. | |
| 2012/0034920 A1 | 2/2012 | Inumaru | |
| 2014/0286313 A1* | 9/2014 | Fu | H04L 69/163 |
| | | | 370/331 |
| 2016/0302063 A1 | 10/2016 | Ahmed et al. | |
| 2018/0270673 A1 | 9/2018 | Chen et al. | |
| 2019/0320988 A1* | 10/2019 | Ahmed | A61B 5/002 |
| 2019/0334893 A1 | 10/2019 | Chen et al. | |
| 2020/0029264 A1* | 1/2020 | Wang | H04W 36/00222 |
| 2020/0045612 A1* | 2/2020 | Stauffer | H04W 24/10 |
| 2020/0196150 A1 | 6/2020 | Chen et al. | |
| 2021/0204135 A1 | 7/2021 | Cho et al. | |
| 2022/0163615 A1* | 5/2022 | Va | G01S 5/0236 |
| 2022/0182199 A1* | 6/2022 | Guo | H04L 5/0032 |
| 2022/0394569 A1* | 12/2022 | Vaidya | H04W 36/0061 |
| 2023/0362163 A1* | 11/2023 | Avetisov | H04L 9/0825 |

FOREIGN PATENT DOCUMENTS

| | | |
|---|---|---|
| CN | 106937342 A | 7/2017 |
| CN | 107534954 A | 1/2018 |
| CN | 107733632 A | 2/2018 |
| CN | 108235316 A | 6/2018 |
| CN | 108235317 A | 6/2018 |
| CN | 110505627 A | 11/2019 |
| CN | 112237017 A | 1/2021 |
| CN | 113645622 A | 11/2021 |

OTHER PUBLICATIONS

Written Opinion of the International Searching Authority in International Application No. PCT/CN2022/133205, mailed on Feb. 20, 2023, with English machine translation provided by WIPO.

Wang, Hucheng et al., "Localized Mobility Management for 5G Ultra Dense Network", "IEEE Transactions on Vehicular Technology", vol. 66, No. 9, Sep. 30, 2017.

Shanzhi Chen et al., User-centric ultra-dense networks for 5G: challenges, methodologies and directions, "IEEE Wireless Communications", vol. 23, No. 2, Apr. 30, 2016.

Office action from corresponding Chinese Patent Application No. 202111392897.3 dated Dec. 18, 2024 with search report and its English translation.

* cited by examiner

DEVICE AUTHENTICATION METHOD AND APPARATUS

CROSS REFERENCE OF RELATED APPLICATIONS

The present disclosure is the U.S. national phase of PCT Application PCT/CN2022/133205 filed on Nov. 21, 2022, which claims a priority of a Chinese Patent Application No. 202111392897.3 filed on Nov. 23, 2021, the disclosures of which are incorporated herein by reference in their entireties.

TECHNICAL FIELD

The present disclosure relates to the field of communication technology, and in particular, to a device authentication method and an apparatus.

BACKGROUND

In ultra-dense scenarios in the 5th Generation Mobile Communication Technology (5G) era, various small base stations in related art, also known as Access Points (APs), will be deployed with more than 10 times. There are a large number of small base stations, and small base stations will develop in the direction of plug-and-play in the future. It is more difficult to manage small base stations, and it is difficult to guarantee the security of small base stations. Due to the existence of rogue or untrusted small cells (APs), if a two-way identity authentication method between the core network and the user is stilled used in user-centric ultra-dense networks (UUDN), the user equipment (UE) may be threatened by the rogue small base stations, that is, user access security cannot be guaranteed; more importantly, if a traditional authentication method is used for small base stations and UE, i.e., each UE and each AP perform an access authentication, due to the continuous movement of UEs, the security authentication efficiency may be adversely affected due to frequent switching between UEs and APs, thus directly reducing the user's network experience.

SUMMARY

The present disclosure is to provide a device authentication method and an apparatus to solve the problem of how to perform an authentication for the device in a UUDN.

A device authentication method is provided in an embodiment of the present disclosure, including:
  obtaining, by a target access point (AP), a first timestamp sent by a local service center (LSC) device and a second timestamp sent by a terminal, where the second timestamp is sent by the LSC device to the terminal, and the first timestamp and the second timestamp are sent by the LSC device based on an AP switching event;
  when the first timestamp is consistent with the second timestamp, determining, by the target AP, that the terminal is an access terminal of the target AP.

Optionally, prior to the obtaining by the target AP the first timestamp sent by the LSC device, the method further includes:
  obtaining, by the target AP, a first AP switching request sent by the LSC device, where the first AP switching request is configured to request the terminal to switch from a source AP to the target AP;
  sending, by the target AP, verification information to the LSC device according to the first AP switching request;
  where the first timestamp is sent to the target AP after the LSC determines that the target AP is a licit AP according to the verification information.

Optionally, the verification information includes identification information of the target AP and password information corresponding to the identification information;
  prior to the obtaining by the target AP the first AP switching request sent by the LSC device, the method further includes:
  sending the identification information and a public-key certificate to the LSC device;
  obtaining the password information corresponding to the identification information sent by the LSC, where the password information is encrypted through the public-key certificate.

Optionally, the method further includes:
  sending the first timestamp to the terminal.

A device authentication method is further provided in an embodiment of the present disclosure, including:
  obtaining, by a terminal, a second timestamp sent by a local service center (LSC) device and a first timestamp sent by a target access point (AP), where the first timestamp and the second timestamp are sent by the LSC device based on an AP switching event;
  when the first timestamp is consistent with the second timestamp, determining, by the terminal, that the target AP is an access AP of the terminal.

Optionally, the method further includes:
  sending the second timestamp to the target AP.

A device authentication method is further provided in an embodiment of the present disclosure, including:
  receiving, by a local service center (LSC) device, a second access point (AP) switching request sent by a source AP, where the second AP switching request is configured to request the terminal to perform an AP switching;
  determining, by the LSC device, a target AP according to the second AP switching request, where the target AP is an AP to which the terminal is connected after the terminal performs the AP switching;
  sending, by the LSC device, a first timestamp to the target AP, and sending a second timestamp to the terminal.

Optionally, the determining the target AP includes:
  determining a switching AP corresponding to a switching time of the terminal as the target AP, according to an AP switching list;
  where switching APs corresponding to different switching time are stored in the AP switching list.

Optionally, the sending by the LSC device the first timestamp to the target AP includes:
  sending a first AP switching request to the target AP, where the first AP switching request is configured to request the terminal to switch from the source AP to the target AP;
  obtaining verification information sent by the target AP according to the first AP switching request;
  when determining that the target AP is a licit AP according to the verification information, sending the first timestamp to the target AP.

Optionally, the verification information includes identification information of the target AP and password information corresponding to the identification information;

the method further includes:
obtaining a hash value corresponding to the password information, according to the password information and a random number;
if the hash value is consistent with a hash value corresponding to the identification information stored in a database, determining that the target AP is a licit AP.

Optionally, prior to the sending the first AP switching request to the target AP, the method further includes:
obtaining identification information of the target AP and a public-key certificate sent by the target AP;
after verifying the identification information through the public-key certificate, generating password information corresponding to the identification information;
sending the password information to the target AP, and generating and storing a hash value corresponding to the identification information according to the password information and a random number.

A device authentication apparatus is further provided in an embodiment of the present disclosure, applied to a target access point (AP), including a memory, a transceiver, and a processor;

the memory is configured to store a computer program; the transceiver is configured to send and receive data under a control of the processor; and the processor is configured to read the computer program in the memory to perform:
obtaining, by the transceiver, a first timestamp sent by a local service center (LSC) device and a second timestamp sent by a terminal, where the second timestamp is sent by the LSC device to the terminal, and the first timestamp and the second timestamp are sent by the LSC device based on an AP switching event;
when the first timestamp is consistent with the second timestamp, determining, by the target AP, that the terminal is an access terminal of the target AP.

Optionally, the processor is further configured to execute the program to perform:
obtaining, by the transceiver, a first AP switching request sent by the LSC device, where the first AP switching request is configured to request the terminal to switch from a source AP to the target AP;
sending, by the transceiver, verification information to the LSC device according to the first AP switching request;
where the first timestamp is sent to the target AP after the LSC determines that the target AP is a licit AP according to the verification information.

Optionally, the verification information includes identification information of the target AP and password information corresponding to the identification information;
the processor is further configured to execute the program to perform:
sending, by the transceiver, the identification information and a public-key certificate to the LSC device;
obtaining, by the transceiver, the password information corresponding to the identification information sent by the LSC, where the password information is encrypted through the public-key certificate.

Optionally, the processor is further configured to execute the program to perform:
sending, by the transceiver, the first timestamp to the terminal.

A device authentication apparatus is further provided in an embodiment of the present disclosure, applied to a terminal, including a memory, a transceiver, and a processor;
the memory is configured to store a computer program; the transceiver is configured to send and receive data under a control of the processor; and the processor is configured to read the computer program in the memory to perform:
obtaining, by the transceiver, a second timestamp sent by a local service center (LSC) device and a first timestamp sent by a target access point (AP), where the first timestamp and the second timestamp are sent by the LSC device based on an AP switching event;
when the first timestamp is consistent with the second timestamp, determining, by the terminal, that the target AP is an access AP of the terminal.

Optionally, the processor is further configured to execute the program to perform:
sending, by the transceiver, the second timestamp to the target AP.

A device authentication apparatus is further provided in an embodiment of the present disclosure, applied to a local service center (LSC) device, including a memory, a transceiver, and a processor;
the memory is configured to store a computer program; the transceiver is configured to send and receive data under a control of the processor; and the processor is configured to read the computer program in the memory to perform:
receiving, by the transceiver, a second access point (AP) switching request sent by a source AP, where the second AP switching request is configured to request the terminal to perform an AP switching;
determining, by the LSC device, a target AP according to the second AP switching request, where the target AP is an AP to which the terminal is connected after the terminal performs the AP switching;
sending, by the transceiver, a first timestamp to the target AP, and sending a second timestamp to the terminal.

Optionally, the processor is further configured to execute the program to perform:
determining a switching AP corresponding to a switching time of the terminal as the target AP, according to an AP switching list;
where switching APs corresponding to different switching time are stored in the AP switching list.

Optionally, the processor is further configured to execute the program to perform:
sending a first AP switching request to the target AP, where the first AP switching request is configured to request the terminal to switch from the source AP to the target AP;
obtaining, by the transceiver, verification information sent by the target AP according to the first AP switching request;
when determining that the target AP is a licit AP according to the verification information, sending, by the transceiver, the first timestamp to the target AP.

Optionally, the verification information includes identification information of the target AP and password information corresponding to the identification information;
the processor is further configured to execute the program to perform:
obtaining a hash value corresponding to the password information, according to the password information and a random number;

if the hash value is consistent with a hash value corresponding to the identification information stored in a database, determining that the target AP is a licit AP.

Optionally, the processor is further configured to execute the program to perform:

obtaining, by the transceiver, identification information of the target AP and a public-key certificate sent by the target AP;

after verifying the identification information through the public-key certificate, generating password information corresponding to the identification information;

sending, by the transceiver, the password information to the target AP, and generating and storing a hash value corresponding to the identification information according to the password information and a random number.

A device authentication apparatus is further provided in an embodiment of the present disclosure, applied to a target AP, including:

a first obtaining unit, configured to obtain a first timestamp sent by a local service center (LSC) device and a second timestamp sent by a terminal, where the second timestamp is sent by the LSC device to the terminal, and the first timestamp and the second timestamp are sent by the LSC device based on an AP switching event;

a first determining unit configured to, when the first timestamp is consistent with the second timestamp, determine that the terminal is an access terminal of the target AP.

A device authentication apparatus is further provided in an embodiment of the present disclosure, applied to a terminal, including:

a second obtaining unit, configured to obtain a second timestamp sent by a local service center (LSC) device and a first timestamp sent by a target access point (AP), where the first timestamp and the second timestamp are sent by the LSC device based on an AP switching event;

a second determining unit, configured to, when the first timestamp is consistent with the second timestamp, determine that the target AP is an access AP of the terminal.

An equipment authentication apparatus is further provided in an embodiment of the present disclosure, applied to a local service center (LSC) equipment, including:

a first receiving unit, configured to receive a second access point (AP) switching request sent by a source AP, where the second AP switching request is configured to request the terminal to perform an AP switching;

a third determining unit, configured to determine a target AP according to the second AP switching request, where the target AP is an AP to which the terminal is connected after the terminal performs the AP switching;

a first transceiving unit, configured to send a first timestamp to the target AP, and send a second timestamp to the terminal.

A processor-readable storage medium is further provided in an embodiment of the present disclosure, where the processor-readable storage medium stores program instructions, the program instructions are configured to enable the processor to perform the device authentication method hereinabove.

The present disclosure has at least the following beneficial effects:

According to the embodiments of the present disclosure, when the terminal needs to perform an AP switching, the LSC sends a first timestamp and a second timestamp to the target AP and the terminal respectively, and the target AP compares the first timestamp with the second timestamp received from the terminal. If the two timestamps are consistent with each other, the terminal is determined to be the terminal that is about to access. In this way, by comparing the timestamps, the access device can be quickly authenticated, thereby improving the efficiency of authentication between the terminal and the AP.

DETAILED DESCRIPTION

The technical solution provided by the embodiments of the present disclosure can be applicable to a variety of systems, especially 5G systems. For example, the applicable systems may be the Global System of Mobile communication (GSM) system, Code Division Multiple Access (CDMA) system, Wideband Code Division Multiple Access (WCDMA) system, Time Division Synchronous Code Division Multiple Access (TD-SCDMA) system, General Packet Radio Service (GPRS) system, Long Term Evolution (LTE) system (including TD-LTE and FDD LTE), Advanced Long Term Evolution (LTE-A) system, Universal Mobile Telecommunication System (UMTS), Worldwide Interoperability For Microwave Access (WiMAX) system, 5G New Radio (NR) system, etc. These systems include terminal devices and network devices. The system may also include core network parts, such as Evolved Packet System (EPS), 5G System (5G System, 5GS)/5G Core Network (5G Core, 5GC), etc.

Figure 1:
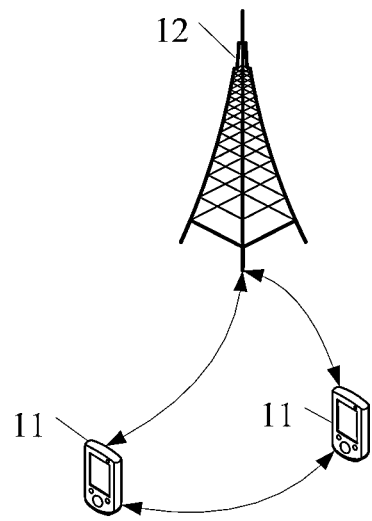
FIG. 1 is a structural view of a network system to which the embodiments of the present disclosure can be applied.

FIG. 1 shows a block diagram of a wireless communication system to which embodiments of the present application are applicable. The wireless communication system includes a terminal 11 and a network device 12. Among them, the terminal 11 can also be called a terminal device or a user terminal (User Equipment, UE). The terminal 11 can be a mobile phone, a tablet computer (Tablet Personal Computer), a laptop computer (Laptop Computer) or a mobile phone, Laptops, Personal Digital Assistants (PDAs), PDAs, Netbooks, Ultra-Mobile Personal Computers (UMPC), Mobile Internet Devices (MID), wearables Wearable Device or vehicle User Equipment (VUE), Pedestrian User Equipment (PUE) and other terminal-side devices. Wearable devices include: bracelets, headphones, glasses, etc. It should be noted that the embodiment of the present application does not limit the specific type of the terminal 11. The network device 12 may be a base station or a core network, where the base station may be referred to as a Node B, an evolved Node B, an access point, a Base Transceiver Station (BTS), a radio base station, a radio transceiver, or a basic service set. (Basic Service Set, BSS), Extended Service Set (ESS), B node, Evolved B node (Evolved Node B, eNB), home B node, home evolved B node, wireless local area network (Wireless Local Area Network, WLAN) access point, WiFi node, transmitting and receiving point (Transmitting Receiving Point, TRP) or some other appropriate terminology in the field, as long as the same technical effect is achieved, the base station is not limited to specific technical terms. It should be noted that in the embodiment of this application, only the base station in the NR system is used. Take as an example, but the specific type of base station is not limited.

In order to enable those skilled in the art to better understand the embodiments of the present disclosure, the following description is first made.

In the future, the network will not have specific cell boundaries, but will be user-centric. The coverage of base stations and their antenna units can be adaptively adjusted according to user business needs and interference distribution. In the user-centric ultra-dense network, the user-centric UUDN no longer has the physical and logical concept of "cell" in the traditional cellular network. Instead, it is replaced by access node groups formed by access nodes AP of different network types on the control plane. APs collaborate dynamically, with strong flexibility and good user experience.

Figure 2:
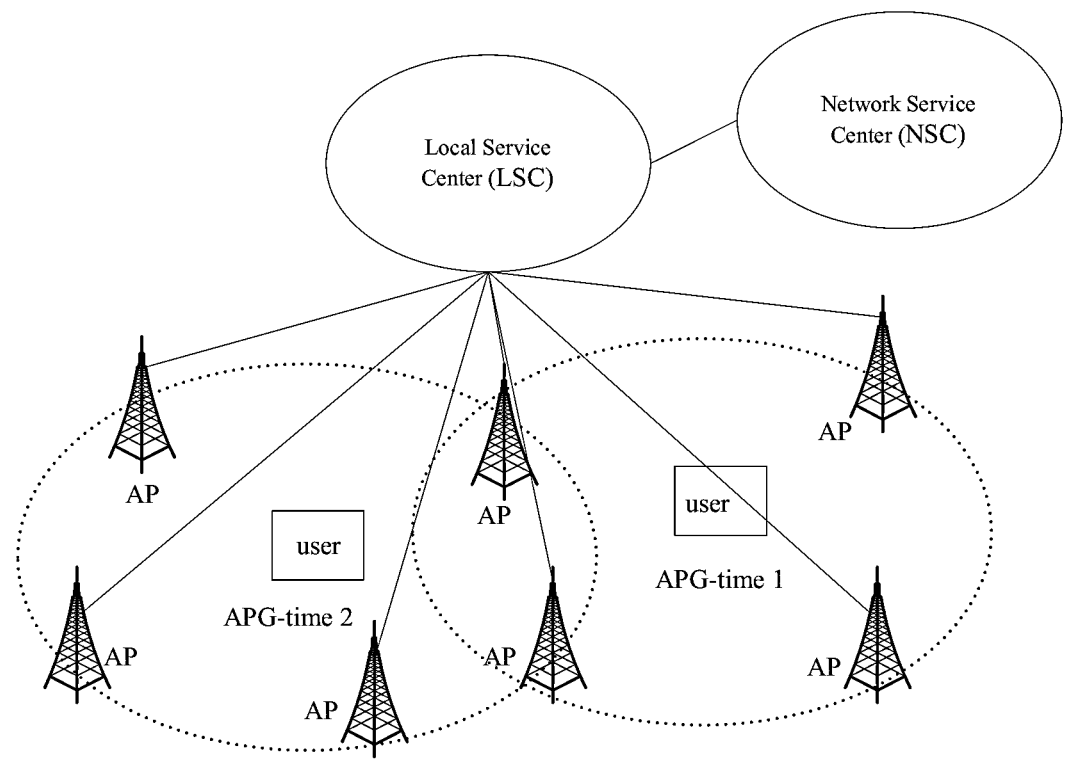
FIG. 2 is a schematic view of the UUDN network architecture.

UUDN is a user-centered ultra-dense network that will organize a dynamic Access Points Group (APG) to provide services for each user. As shown in FIG. 2, in the UUDN network architecture, the access node is not directly connected to the 5G core network, but is organized through many access point (AP) s to form a "user-centered" access node group APG, through the local service center (Location Service Center (LSC) is connected to the Network Service Center (NSC), which is the 5G core network. APG members will dynamically change "accompanying" the user's movement to provide users with seamless network services.

LSC is the control service center that organizes dynamic APG service users and provides localized control and management functions, including access control, multi-radio access technology (Radio Access Technology, RAT) collaboration, local mobility management, local service quality (Quality of Service, QoS) management, local data routing, and centralized user data processing.

As the network service center, NSC is responsible for providing control functions including user policy control, authentication, authorization and accounting (Authentication, Authorization and Accounting) and high-level mobility management.

UUDN mainly faces the following two security issues:

In an ultra-dense network environment, if only the traditional access authentication and key agreement (AKA) process is performed on the user UE, it is difficult to avoid the possibility of fake access point (AP). As a result, the security of ultra-dense networks faces major threats, and user UEs face security threats such as being hijacked by rouge or malicious access point (AP).

In the UUDN network architecture, large-density deployment of APs of different network types will lead to frequent and complex switching and authentication processes. When the user UE and each network access point (AP) perform access authentication, due to the continuous movement of the user UE, frequent switching between the UE and APs will cause security authentication efficiency problems, thus directly reducing the user's network experience.

The technical solutions in the embodiments of the present disclosure will be clearly and completely described below with reference to the accompanying drawings in the embodiments of the present disclosure. Obviously, the described embodiments are only some of the embodiments of the present application and are not all embodiments. Based on the embodiments in this application, all other embodiments obtained by those of ordinary skill in the art without creative efforts fall within the scope of protection of this application.

Figure 3:
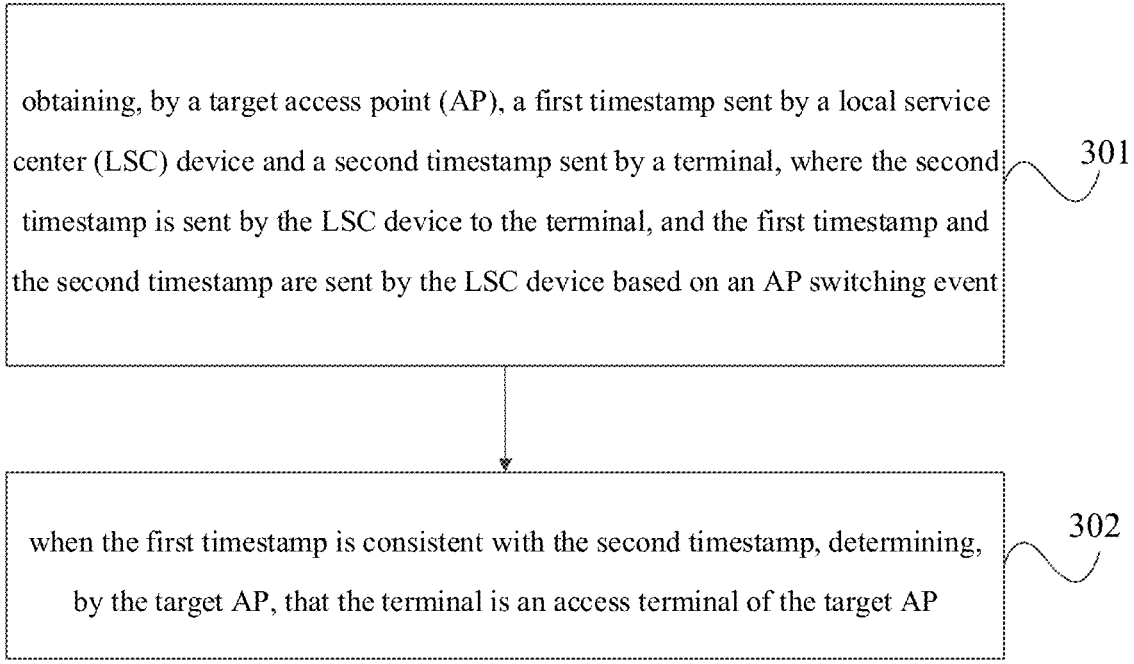
FIG. 3 is a first flow chart of a device authentication method according to an embodiment of the present disclosure.

As shown in FIG. 3, an embodiment of the present disclosure provides a device authentication method, including:

Step 301: obtaining, by a target access point (AP), a first timestamp sent by a local service center (LSC) device and a second timestamp sent by a terminal, where the second timestamp is sent by the LSC device to the terminal, and the first timestamp and the second timestamp are sent by the LSC device based on an AP switching event or an AP switching request.

For example, the access point (AP) switching event may be that the LSC receives a switching request from the source AP, or the LSC determines the switching strategy, or the LSC determines the target AP, or the LSC determines that the target AP is a licit AP, etc.;

In the embodiment of the present disclosure, the terminal reports measurements, and the source AP decides whether to perform AP switching based on the measurement information reported by the terminal. If it is determined to perform AP switching, the source AP sends a switching request to the LSC device to request the LSC device to determine which AP to switch to, that is, the LSC device determines the target AP. After determining the target AP, the LSC device generates a timestamp and sends the timestamp to the target AP and the terminal respectively. Here, the timestamp sent by the LSC device to the target AP is called a first timestamp, and the timestamp sent by the LSC device to the terminal is called a second timestamp, and the first timestamp and the second timestamp are the same.

Optionally, the first timestamp or the second timestamp may be a specific time of switching, or may be other time information.

Step 302: when the first timestamp is consistent with the second timestamp, determining, by the target AP, that the terminal is an access terminal of the target AP.

In this step, the target AP compares the first timestamp received from the LSC device with the second timestamp sent by the terminal. If the two timestamps are consistent with each other, the terminal is determined to be a licit terminal, that is, the terminal is determined to be an access terminal of the target AP, and then a switching preparation is performed.

According to the device authentication method of the embodiment of the present disclosure, when the terminal needs to perform an AP switching, the LSC sends a first timestamp and a second timestamp to the target AP and the terminal respectively, and the target AP compares the first timestamp with the second timestamp received from the terminal. If the two timestamps are consistent with each other, it is determined that the terminal is about to access. In this way, the access device can be quickly authenticated by comparing the timestamps, thereby improving the efficiency of authentication between the terminal and the AP.

Optionally, prior to the obtaining by the target AP the first timestamp sent by the LSC device, the method further includes:
  obtaining, by the target AP, a first AP switching request sent by the LSC device, where the first AP switching request is configured to request the terminal to switch from a source AP to the target AP;
  sending, by the target AP, verification information to the LSC device according to the first AP switching request;
  where the first timestamp is sent to the target AP after the LSC determines that the target AP is a licit AP according to the verification information.

According to the embodiments of the present disclosure, after the LSC device determines the target AP, the LSC device sends the first AP switching request to the target AP to request the terminal to switch from the source AP to the target AP. The target AP responds to the request and sends verification information to the LSC device. After the LSC device determines that the target AP is a rogue AP based on the verification information, it generates a timestamp and sends it to the target AP and the terminal. In this way, the LSC device authenticates the AP.

Optionally, the verification information includes identification information of the target AP and password information corresponding to the identification information;
  prior to the obtaining by the target AP the first AP switching request sent by the LSC device, the method further includes:
  sending the identification information and a public-key certificate to the LSC device;
  obtaining the password information corresponding to the identification information sent by the LSC, where the password information is encrypted through the public-key certificate.

Here, the above identification information is the identity identification information of the target AP, which may be but is not limited to, for example, AP-ID. Other identifiers that can uniquely identify the target AP may be applied here too.

In the embodiments of the present disclosure, in the UUDN scenario, a large number of densely deployed APs form an AP group-APG with the UE as the center to provide services for the UE. After the AP enters the network, it needs to be authenticated at the LSC first. The AP first sends a digital signature and a public-key certificate to the LSC. The content of the digital signature is the AP-ID (the digital signature is encrypted with a private key). The AP-ID can also be other identifiers representing the AP identity, which determines the uniqueness of the AP identity. After the LSC device verifies the identification information of the AP based on the above public-key certificate (the public-key certificate matches the above private key), it searches its own authentication information database. If there is no authentication information corresponding to the AP-ID, authentication information is created for the AP. The authentication information database entries may include the following:
  a username AP-ID;
  a random number rand, the random number is generated by the LSC device. The embodiment of the present disclosure does not specifically limit the generation algorithm, length, etc. of the random number. The random number is used to store password information, making the storage of password information in the LSC device more concealed.

Hash value: this hash value is obtained based on password information and random numbers. The password information is generated by the LSC device and corresponds to the AP_ID or other identity identifiers that represent the uniqueness of the AP identity. There are no requirements for its generation algorithm, length, etc., the hash value is obtained after hashing the password information and random numbers in the LSC device, and is stored in the LSC device to prevent passwords from being stored in plain text.

After the target AP sends the verification information to the LSC, the LSC device obtains the password information corresponding to the target AP's identification information, encrypts the password information using the public-key certificate, and sends it to the target AP.

Optionally, the method in the embodiment of the present disclosure further includes:
  sending the first timestamp to the terminal.

Here, the first timestamp is sent to the terminal so that the terminal compares the first timestamp with the second timestamp sent by the LSC device to the terminal, so as to perform the authentication of the target AP.

According to the embodiments of the present disclosure, when the terminal needs to perform an AP switching, the LSC sends a first timestamp and a second timestamp to the target AP and the terminal respectively, and the target AP compares the first timestamp with the second timestamp received from the terminal. If the two timestamps are consistent with each other, the terminal is determined to be the terminal that is about to access. In this way, by comparing the timestamps, the access device can be quickly authenticated, thereby improving the efficiency of authentication between the terminal and the AP.

Figure 4:
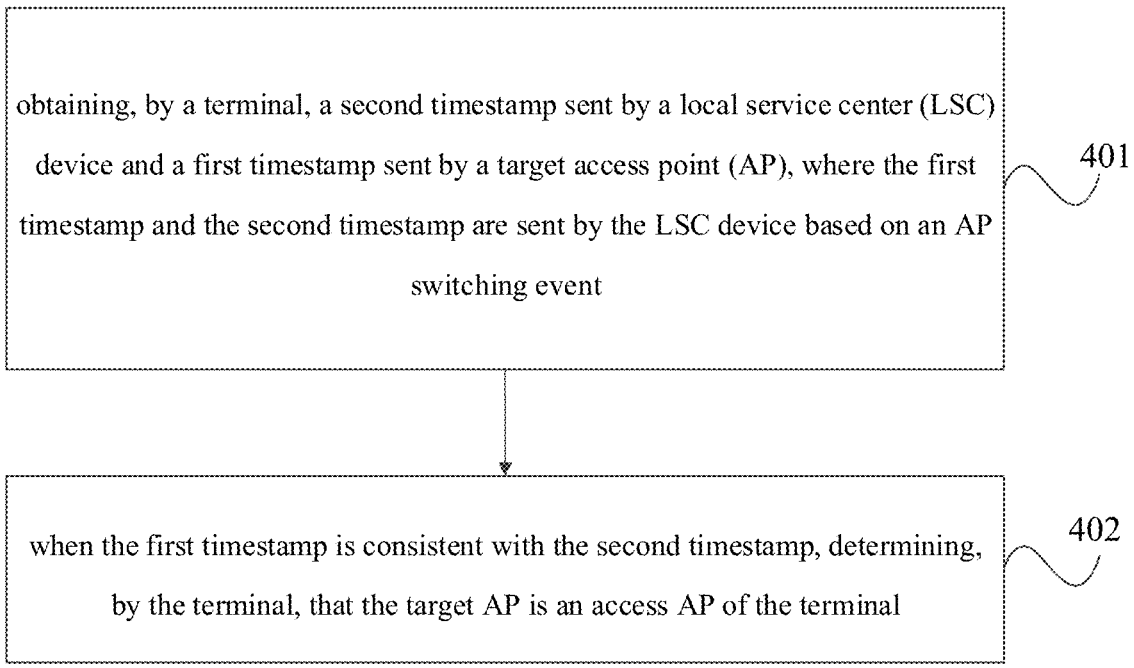
FIG. 4 is a second flow chart of a device authentication method according to an embodiment of the present disclosure.

As shown in FIG. 4, an embodiment of the present disclosure further provides a device authentication method, including:

Step 401: obtaining, by a terminal, a second timestamp sent by a local service center (LSC) device and a first timestamp sent by a target access point (AP), where the first timestamp and the second timestamp are sent by the LSC device based on an AP switching event or an AP switching request.

In the embodiment of the present disclosure, the terminal reports measurements, and the source AP decides whether to perform AP switching based on the measurement information reported by the terminal. If it is determined to perform AP switching, the source AP sends a switching request to the LSC device to request the LSC device to determine which AP to switch to, that is, the LSC device determines the target AP. After determining the target AP, the LSC device generates a timestamp and sends the timestamp to the target AP and the terminal respectively. Here, the timestamp sent by the LSC device to the target AP is called a first timestamp, and the timestamp sent by the LSC device to the terminal is called a second timestamp, and the first timestamp and the second timestamp are the same.

Optionally, the first timestamp or the second timestamp may be a specific time of switching, or may be other time information.

Step 402: when the first timestamp is consistent with the second timestamp, determining, by the terminal, that the target AP is an access AP of the terminal.

In this step, the terminal compares the second timestamp received from the LSC device with the second timestamp sent by the target AP. If the two timestamps are consistent, the target AP is determined to be a licit AP, that is, the target AP is determined to be the AP that needs to be accessed by the terminal, and then a switching preparation is performed.

According to the device authentication method of the embodiment of the present disclosure, when the terminal needs to perform an AP switching, the LSC sends a first timestamp and a second timestamp to the target AP and the terminal respectively, and the terminal compares the second timestamp with the first timestamp received from the target AP. If the two are consistent, the target AP is determined to be the AP that is about to access. In this way, by comparing the timestamps, the access device can be quickly authenticated, thereby improving the efficiency of authentication between the terminal and the AP.

Optionally, the method in the embodiment of the present disclosure further includes:

sending the second timestamp to the target AP.

Here, the second timestamp is sent to the target AP so that the target AP compares the second timestamp with the first timestamp sent by the LSC device to the target AP, thereby authenticating the terminal.

According to the device authentication method of the embodiment of the present disclosure, when the terminal needs to perform an AP switching, the LSC sends a first timestamp and a second timestamp to the target AP and the terminal respectively, and the terminal compares the second timestamp with the first timestamp received from the target AP. If the two are consistent, the target AP is determined to be the AP that is about to access. In this way, by comparing the timestamps, the access device can be quickly authenticated, thereby improving the efficiency of authentication between the terminal and the AP.

Figure 5:
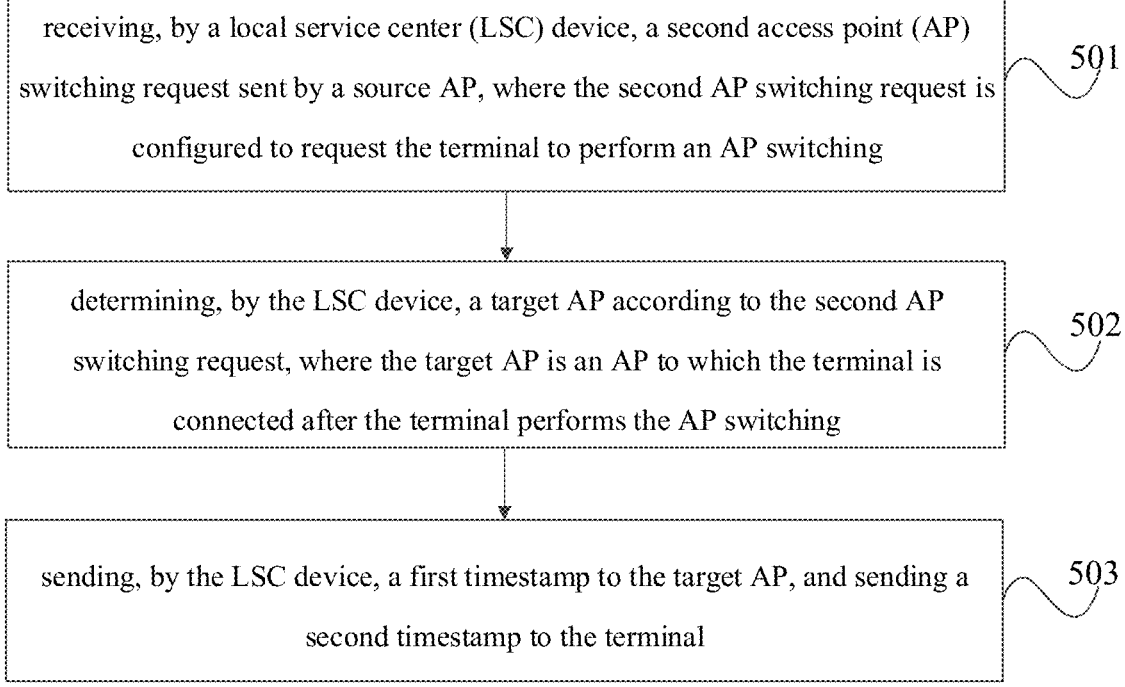
FIG. 5 is a third flow chart of a device authentication method according to an embodiment of the present disclosure.

As shown in FIG. 5, the present disclosure further provides a device authentication method, including:

Step 501: receiving, by a local service center (LSC) device, a second access point (AP) switching request sent by a source AP, where the second AP switching request is configured to request the terminal to perform an AP switching.

In the embodiment of the present disclosure, the terminal reports measurements, and the source AP decides whether to perform AP switching based on the measurement information reported by the terminal. If it is determined to perform AP switching, the source AP sends a switching request (second AP switching request) to the LSC device, requesting the LSC device to determine which AP to switch to, that is, the LSC device determines the target AP.

Step 502: determining, by the LSC device, a target AP according to the second AP switching request, where the target AP is an AP to which the terminal is connected after the terminal performs the AP switching.

After the LSC device determines the target AP, it determines the target AP based on the AP switching list or other switching algorithms.

Step 503: sending, by the LSC device, a first timestamp to the target AP, and sending a second timestamp to the terminal.

In this step, after the LSC device determines the target AP, it generates a timestamp and sends the timestamp to the target AP and the terminal respectively. Here, the timestamp sent by the LSC device to the target AP is called a first timestamp. The timestamp sent to the terminal is called a second timestamp, and the first timestamp and the second timestamp are the same.

According to the device authentication method of the embodiment of the present disclosure, when the terminal needs to perform an AP switching, the LSC sends a first timestamp and a second timestamp to the target AP and the terminal respectively, and the terminal compares the second timestamp with the first timestamp received from the target AP. If the two are consistent, the target AP is determined to be the AP that is about to access. In this way, by comparing the timestamps, the access device can be quickly authenticated, thereby improving the efficiency of authentication between the terminal and the AP.

Optionally, the determining the target AP includes:

determining a switching AP corresponding to a switching time of the terminal as the target AP, according to an AP switching list;

where switching APs corresponding to different switching time are stored in the AP switching list.

For example, the AP switching list is: t1: AP2; t2: AP4, that is, switching to AP2 at time t1 and switching to AP4 at time t2.

The above AP switching list is obtained based on the channel conditions of other UEs connected to the LSC device. The channel conditions are the channel conditions measured by other UEs before the target time, and the target time is the switching time of the current UE.

Here, the LSC device determines the AP switching list according to the above channel conditions. Based on the AP switching list, it can predict the UE's switching route, that is, only the LSC knows the next base station to which the UE will switch. Each time a switch occurs, the LSC notifies the UE and the AP that the UE is about to access. Security is reflected in the fact that only the AP and the UE know the switching time, and the UE only needs to check the timestamp with the AP to confirm the other party's identity.

Figure 6:
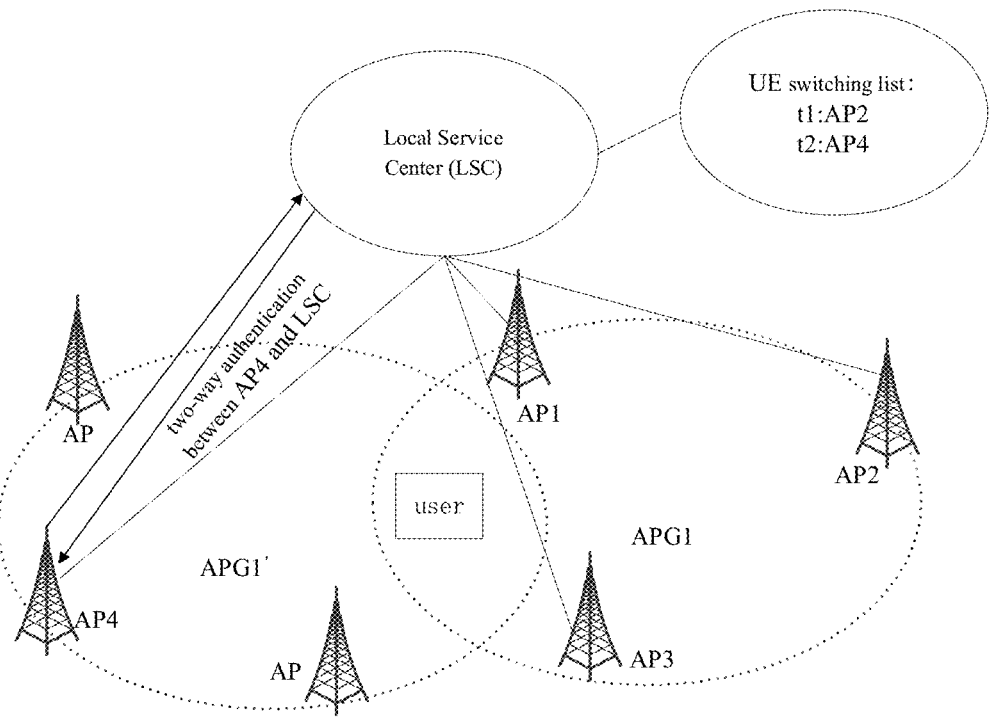
FIG. 6 is a schematic view showing a dynamic change of the APG in an embodiment of the present disclosure.

In the embodiment of the present disclosure, after the APG is established, its members can change dynamically according to the user's mobile location or wireless environment, such as a new node joining the APG or an existing node leaving the APG. In the embodiment of the present disclosure, the method for a new node to join the APG, that is, the UE switches to a new AP, adopts a switching list. As shown in FIG. 6, the LSC stores a switching list of the current UE, which indicates the switching route of the UE after the current moment. When the UE moves, the LSC notifies the UE of the access base station node corresponding to the time t2: AP4 according to the switching list, and sends the corresponding timestamp t2 to the UE, and at the same time sends the timestamp t2 to AP4, in preparation for the UE to disconnect AP2 and switch to AP4. After the UE and AP4 confirm that the timestamps are both t2, the UE switches to AP4, and the members of APG1 change from AP1, AP2, AP3 to AP1, AP3, AP4 according to the switching list of the LSC, and the switching is completed.

Optionally, the sending by the LSC device the first timestamp to the target AP includes:
  sending a first AP switching request to the target AP, where the first AP switching request is configured to request the terminal to switch from the source AP to the target AP;
  obtaining verification information sent by the target AP according to the first AP switching request;
  when determining that the target AP is a licit AP according to the verification information, sending the first timestamp to the target AP.

According to the device authentication method of the embodiment of the present disclosure, after the LSC device determines the target AP, it sends the first AP switching request to the target AP to request the terminal to switch from the source AP to the target AP. The target AP responds to the request and sends verification information to the LSC device. After the LSC device determines that the target AP is a rogue AP based on the verification information, it generates a timestamp and sends it to the target AP and the terminal. In this way, the LSC device authenticates the AP.

Figure 7:
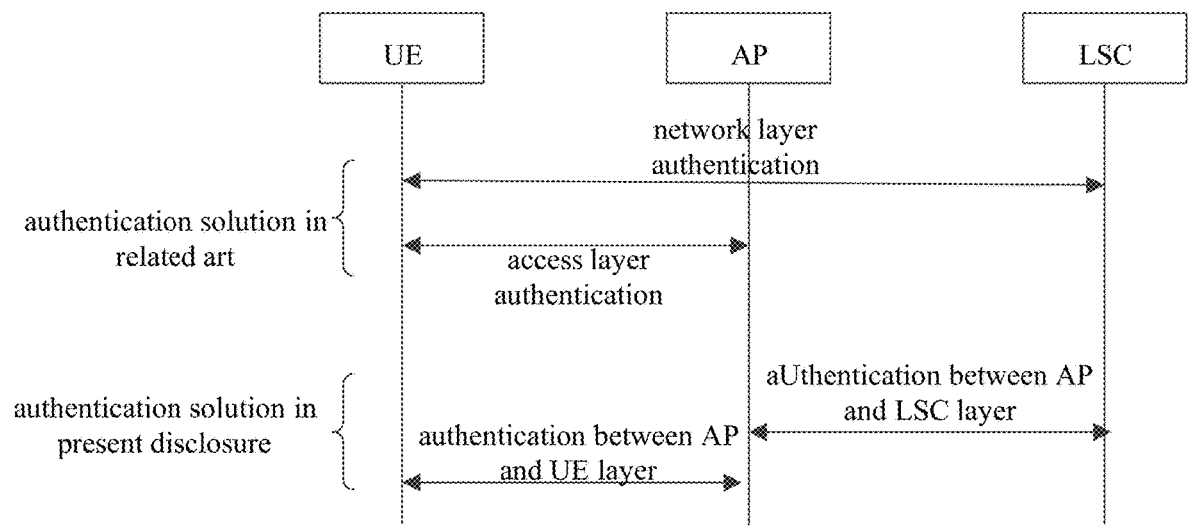
FIG. 7 is a schematic view of a segmented authentication according to an embodiment of the present disclosure.

According to the device authentication method of the embodiment of the present disclosure, in order to ensure the legitimacy of the AP, the LSC authenticates the AP to avoid occupying too many resources of the UE and consuming the power of the UE. As shown in FIG. 7, the embodiment of the present disclosure adopts segmented authentication, that is, after the AP is successfully authenticated with the LSC, the AP is authenticated with the UE again, which can avoid some illicit APs' posing security threats.

Optionally, the verification information includes identification information of the target AP and password information corresponding to the identification information;
  the method further includes:
    obtaining a hash value corresponding to the password information, according to the password information and a random number;
    if the hash value is consistent with a hash value corresponding to the identification information stored in a database, determining that the target AP is a licit AP.

Optionally, prior to the sending the first AP switching request to the target AP, the method further includes:
  obtaining identification information of the target AP and a public-key certificate sent by the target AP;
  after verifying the identification information through the public-key certificate, generating password information corresponding to the identification information;
  sending the password information to the target AP, and generating and storing a hash value corresponding to the identification information according to the password information and a random number.

After the target AP sends the verification information to the LSC, the LSC device obtains the password information corresponding to the target AP's identification information, encrypts the password information using the public-key certificate, and sends it to the target AP.

The device authentication method of the present disclosure will be described below with reference to specific embodiments.

Figure 8:
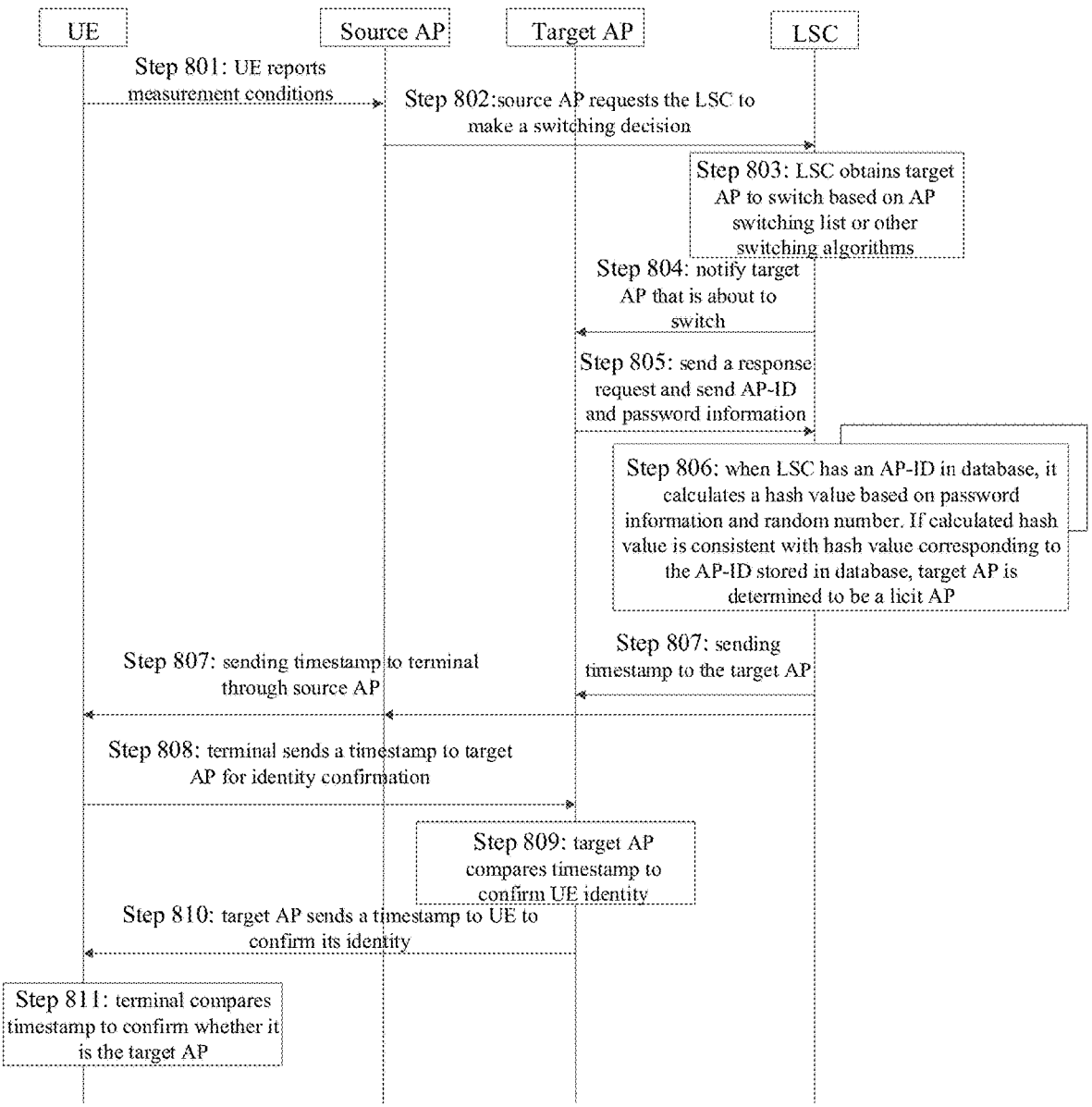
FIG. 8 is an interaction schematic view of a device authentication method according to an embodiment of the present disclosure.

As shown in FIG. 8, the device authentication method of the present disclosure includes:
  Step 801: UE reports measurement conditions.
  Step 802: the source AP requests the LSC to make a switching decision.
  Step 803: the LSC obtains the target AP to switch based on the AP switching list or other switching algorithms.
  Step 804: notify the target AP that is about to switch.
  Step 805: the target AP sends a response request and sends AP-ID and password information.
  Step 806: when the LSC has an AP-ID in the database, it calculates a hash value based on the password information and the random number. If the calculated hash value is consistent with the hash value corresponding to the AP-ID stored in the database, the target AP is determined to be a licit AP.
  Step 807: sending the timestamp to the target AP, and sending the timestamp to the terminal through the source AP.
  Step 808: the terminal sends a timestamp to the target AP for identity confirmation.
  Step 809: the target AP compares the timestamp to confirm the UE identity.
  Step 810: the target AP sends a timestamp to the UE to confirm its identity.
  Step 811: the terminal compares the timestamp to confirm whether it is the target AP.

In the method of the embodiment of the present disclosure, the UE and the AP mutually confirm whether the other party is the UE/AP that is about to access through the timestamp. If the timestamps are consistent, fast authentication can be achieved, thereby improving the authentication efficiency between the UE and the AP. In order to ensure the legitimacy of the AP, the LSC authenticates the AP to avoid occupying too many resources of the UE and consuming its power. Since there are many heterogeneous APs deployed in ultra-dense networks and they support plug-and-play, the segmented authentication disclosed in the present disclosure is adopted, that is, after the AP and the LSC are successfully authenticated, the AP authenticates with the UE again, which can avoid security threats from some illicit APs.

Figure 9:
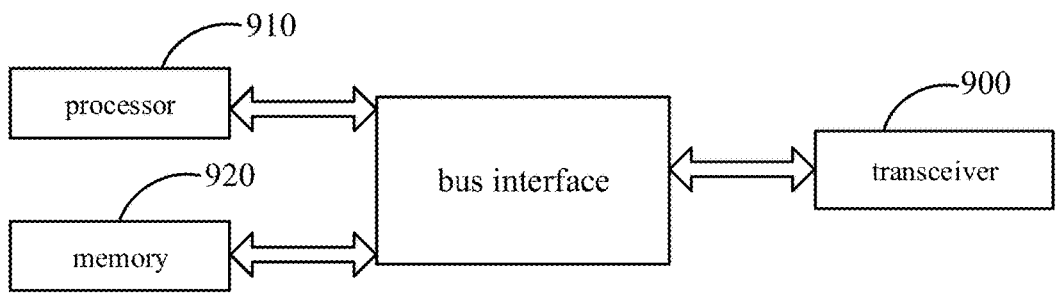
FIG. 9 is first structural block diagram of a device authentication apparatus according to an embodiment of the present disclosure.

As shown in FIG. 9, the embodiment of the present disclosure provides a device authentication apparatus, including a memory 920, a transceiver 900, and a processor 910;

The memory 920 is used to store computer programs; the transceiver 900 is used to send and receive data under the control of the processor;

In one embodiment of the present disclosure, the processor 910 is configured to read the computer program in the memory to perform:
  obtaining, by the transceiver 900, a first timestamp sent by a local service center (LSC) device and a second timestamp sent by a terminal, where the second timestamp is sent by the LSC device to the terminal, and the first timestamp and the second timestamp are sent by the LSC device based on an AP switching event or an AP switching request;
  when the first timestamp is consistent with the second timestamp, determining, by the target AP, that the terminal is an access terminal of the target AP.

Optionally, the processor 910 is further configured to execute the program to perform:
  obtaining, by the transceiver 900, a first AP switching request sent by the LSC device, where the first AP switching request is configured to request the terminal to switch from a source AP to the target AP;
  sending, by the transceiver 900, verification information to the LSC device according to the first AP switching request;
  where the first timestamp is sent to the target AP after the LSC determines that the target AP is a licit AP according to the verification information.

Optionally, the verification information includes identification information of the target AP and password information corresponding to the identification information;
the processor 910 is further configured to execute the program to perform:
sending, by the transceiver 900, the identification information and a public-key certificate to the LSC device;
obtaining, by the transceiver 900, the password information corresponding to the identification information sent by the LSC, where the password information is encrypted through the public-key certificate.

Optionally, the processor 910 is further configured to execute the program to perform:
sending, by the transceiver 900, the first timestamp to the terminal.

In another embodiment of the present disclosure, the processor 910 is configured to read the computer program in the memory to perform:
receiving, by the transceiver 900, a second access point (AP) switching request sent by a source AP, where the second AP switching request is configured to request the terminal to perform an AP switching;
determining, by the LSC device, a target AP according to the second AP switching request, where the target AP is an AP to which the terminal is connected after the terminal performs the AP switching;
sending, by the transceiver 900, a first timestamp to the target AP, and sending a second timestamp to the terminal.

Optionally, the processor 910 is further configured to execute the program to perform:
determining a switching AP corresponding to a switching time of the terminal as the target AP, according to an AP switching list;
where switching APs corresponding to different switching time are stored in the AP switching list.

Optionally, the processor 910 is further configured to execute the program to perform:
sending a first AP switching request to the target AP, where the first AP switching request is configured to request the terminal to switch from the source AP to the target AP;
obtaining, by the transceiver 900, verification information sent by the target AP according to the first AP switching request;
when determining that the target AP is a licit AP according to the verification information, sending, by the transceiver, the first timestamp to the target AP.

Optionally, the verification information includes identification information of the target AP and password information corresponding to the identification information;
the processor 910 is further configured to execute the program to perform:
obtaining a hash value corresponding to the password information, according to the password information and a random number;
if the hash value is consistent with a hash value corresponding to the identification information stored in a database, determining that the target AP is a licit AP.

Optionally, the processor 910 is further configured to execute the program to perform:
obtaining, by the transceiver 900, identification information of the target AP and a public-key certificate sent by the target AP;
after verifying the identification information through the public-key certificate, generating password information corresponding to the identification information;
sending, by the transceiver 900, the password information to the target AP, and generating and storing a hash value corresponding to the identification information according to the password information and a random number.

In FIG. 9, the bus architecture can include any number of interconnected buses and bridges, specifically one or more processors represented by processor 910 and various circuits of memory represented by memory 920 are linked together. The bus architecture can also link various other circuits such as peripheral devices, voltage regulators, and power management circuits together, which are all well known in the art, so they are not further described herein. The bus interface provides an interface. The transceiver 900 can be a plurality of components, that is, including a transmitter and a receiver, providing a unit for communicating with various other devices on a transmission medium, and these transmission media include transmission media such as wireless channels, wired channels, and optical cables. The processor 910 is responsible for managing the bus architecture and general processing, and the memory 920 can store data used by the processor 910 when performing operations.

The processor 910 may be a central processing unit (CPU), an application specific integrated circuit (ASIC), a field programmable gate array (Field-Programmable Gate Array, FPGA) or a complex programmable logic device (Complex Programmable Logic Device (CPLD), the processor can also adopt a multi-core architecture.

It should be noted here that the above-mentioned device provided by the embodiment of the present disclosure can implement all the method steps implemented by the above-mentioned device authentication method embodiment, and can achieve the same technical effect. The method in this embodiment will no longer be discussed here. The same parts and beneficial effects of the embodiments will be described in detail.

Figure 10:
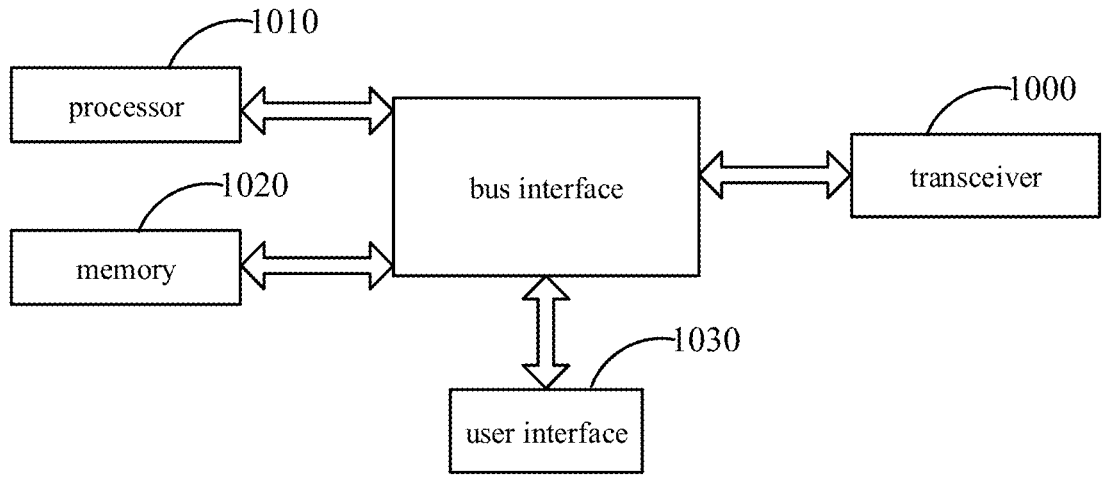
FIG. 10 is second structural block diagram of a device authentication apparatus according to an embodiment of the present disclosure.

As shown in FIG. 10, the embodiment of the present disclosure also provides a device authentication device, applied to a terminal, including a memory 1020, a transceiver 1000, and a processor 1010;
the memory 1020 is configured to store a computer program; the transceiver 1000 is configured to send and receive data under a control of the processor; and the processor 1010 is configured to read the computer program in the memory to perform:
obtaining, by the transceiver 1000, a second timestamp sent by a local service center (LSC) device and a first timestamp sent by a target access point (AP), where the first timestamp and the second timestamp are sent by the LSC device based on an AP switching event or an AP switching request;
when the first timestamp is consistent with the second timestamp, determining, by the terminal, that the target AP is an access AP of the terminal.

In FIG. 10, the bus architecture may include any number of interconnected buses and bridges, specifically one or more processors represented by processor 1010 and various circuits of memory represented by memory 1020 are linked together. The bus architecture can also link various other circuits such as peripherals, regulators, and power management circuits together, which are all well known in the art and are therefore not further described herein. The bus interface provides an interface. The transceiver 1000 may be a plurality of components, namely, a transmitter and a receiver, providing a unit for communicating with various other devices on a transmission medium, and these transmission media include transmission media such as wireless channels, wired channels, and optical cables. For different user devices, the user interface 1030 may also be an interface that can connect externally or internally to required devices, and the connected devices include but are not limited to a keypad, a display, a speaker, a microphone, a joystick, and the like.

The processor 1010 is responsible for managing the bus architecture and general processing, and the memory 1020 can store data used by the processor 1010 when performing operations.

Optionally, the processor 1010 may be a CPU, an application specific integrated circuit (ASIC), a field programmable gate array (FPGA), or a microprocessor. The processor can also adopt a multi-core architecture.

The processor calls the computer program stored in the memory to execute any of the methods provided in the embodiments of the present application according to the obtained executable instructions. The processor and the memory can also be arranged physically separately.

Optionally, when executing the program, the processor 1010 further implements the following steps:
sending, by the transceiver 1000, the second timestamp to the target AP.

It should be noted here that the above-mentioned device provided by the embodiment of the present disclosure can implement all the method steps implemented by the above-mentioned device authentication method embodiment applied to the terminal, and can achieve the same technical effect. The parts and beneficial effects of this embodiment that are the same as the method embodiment will not be described in detail here.

Figure 11:
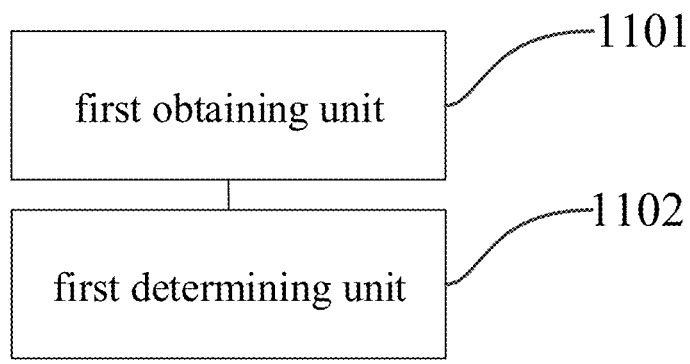
FIG. 11 is a first module schematic diagram of a device authentication apparatus according to an embodiment of the present disclosure.

As shown in FIG. 11, the embodiment of the present disclosure further provides a device authentication apparatus, which is applied to a target AP, including:
a first obtaining unit 1101, configured to obtain a first timestamp sent by a local service center (LSC) device and a second timestamp sent by a terminal, where the second timestamp is sent by the LSC device to the terminal, and the first timestamp and the second timestamp are sent by the LSC device based on an AP switching event;
a first determining unit 1102, configured to, when the first timestamp is consistent with the second timestamp, determine that the terminal is an access terminal of the target AP.

Optionally, the apparatus further includes:
a third obtaining unit, configured to obtain a first AP switching request sent by the LSC device, where the first AP switching request is configured to request the terminal to switch from a source AP to the target AP;
a second transceiving unit, configured to send verification information to the LSC device according to the first AP switching request;
where the first timestamp is sent to the target AP after the LSC determines that the target AP is a licit AP according to the verification information.

Optionally, the verification information includes identification information of the target AP and password information corresponding to the identification information;
the apparatus further includes:
a third transceiving unit, configured to send the identification information and a public-key certificate to the LSC device;
a fourth obtaining unit, configured to obtain the password information corresponding to the identification information sent by the LSC, where the password information is encrypted through the public-key certificate.

Optionally, the apparatus further includes:
a fourth transceiving unit, configured to send the first timestamp to the terminal.

It should be noted here that the above-mentioned device provided by the embodiment of the present disclosure can implement all the method steps implemented by the above-mentioned device authentication method embodiment, and can achieve the same technical effect. The method in this embodiment will no longer be discussed here. The same parts and beneficial effects of the embodiments will be described in detail.

Figure 12:
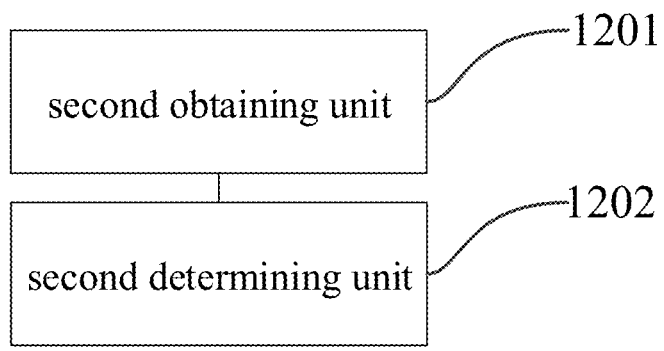
FIG. 12 is a second module schematic diagram of a device authentication apparatus according to an embodiment of the present disclosure.

As shown in FIG. 12, an embodiment of the present disclosure also provides a device authentication device, which is applied to a terminal and includes:
a second obtaining unit 1201, configured to obtain a second timestamp sent by a local service center (LSC) device and a first timestamp sent by a target access point (AP), where the first timestamp and the second timestamp are sent by the LSC device based on an AP switching event;
a second determining unit 1202, configured to, when the first timestamp is consistent with the second timestamp, determine that the target AP is an access AP of the terminal.

Optionally, the apparatus further includes:
a fifth transceiving unit, configured to send the second timestamp to the target AP.

It should be noted here that the above-mentioned device provided in the embodiment of the present disclosure can implement all the method steps implemented in the above-mentioned device authentication method embodiment, and can achieve the same technical effect. The parts and beneficial effects of this embodiment that are the same as those in the method embodiment will not be described in detail here.

Figure 13:
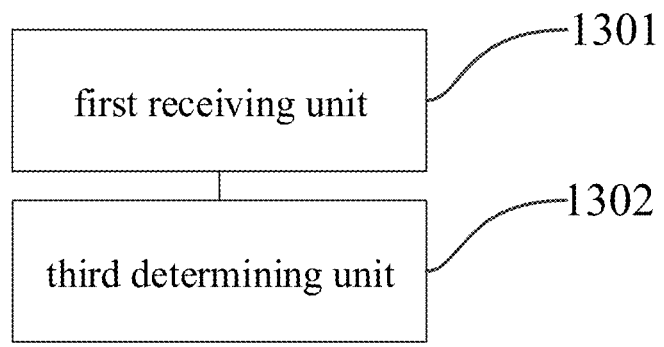
FIG. 13 is a third module schematic diagram of a device authentication apparatus according to an embodiment of the present disclosure.

FIG. 13, the embodiment of the present disclosure further provides a device authentication apparatus, which is applied to a local service center (LSC) device, including:
a first receiving unit 1301, configured to receive a second access point (AP) switching request sent by a source AP, where the second AP switching request is configured to request the terminal to perform an AP switching;
a third determining unit 1302, configured to determine a target AP according to the second AP switching request, where the target AP is an AP to which the terminal is connected after the terminal performs the AP switching;
a first transceiving unit 1303, configured to send a first timestamp to the target AP, and send a second timestamp to the terminal.

Optionally, the determining the target AP includes:
determining a switching AP corresponding to a switching time of the terminal as the target AP, according to an AP switching list;
where switching APs corresponding to different switching time are stored in the AP switching list.

Optionally, the first transceiving unit includes:
a first transceiving sub-unit, configured to send a first AP switching request to the target AP, where the first AP switching request is configured to request the terminal to switch from the source AP to the target AP;
a first obtaining sub-unit, configured to obtain verification information sent by the target AP according to the first AP switching request;

a second transceiving sub-unit, configured to, when determining that the target AP is a licit AP according to the verification information, send the first timestamp to the target AP.

Optionally, the verification information includes identification information of the target AP and password information corresponding to the identification information;

the apparatus further includes:

a fifth obtaining unit, configured to obtain a hash value corresponding to the password information, according to the password information and a random number;

a fourth determining unit, configured to, if the hash value is consistent with a hash value corresponding to the identification information stored in a database, determine that the target AP is a licit AP.

Optionally, the apparatus further includes:

a sixth obtaining unit, configured to obtain identification information of the target AP and a public-key certificate sent by the target AP;

a first generating unit, configured to after verifying the identification information through the public-key certificate, generate password information corresponding to the identification information;

a sixth transceiving unit, configured to send the password information to the target AP, and generate and store a hash value corresponding to the identification information according to the password information and a random number.

It should be noted here that the above-mentioned device provided in the embodiment of the present disclosure can implement all the method steps implemented in the above-mentioned device authentication method embodiment, and can achieve the same technical effect. The parts and beneficial effects of this embodiment that are the same as those in the method embodiment will not be described in detail here.

It should be noted that the division of units in the embodiment of the present application is schematic and is only a logical function division. In actual implementation, there may be other division methods. In addition, each functional unit in various embodiments of the present application may be integrated into one processing unit, or each unit may exist physically alone, or two or more units may be integrated into one unit. The above integrated units can be implemented in the form of hardware or software functional units.

If the integrated unit is implemented in the form of a software functional unit and sold or used as an independent product, it may be stored in a processor-readable storage medium. Based on this understanding, the technical solution of the present application is essentially or contributes to the relevant technology, or all or part of the technical solution can be embodied in the form of a software product, and the computer software product is stored in a storage medium, It includes several instructions to cause a computer device (which can be a personal computer, a server, or a network device, etc.) or a processor to execute all or part of the steps of the methods described in various embodiments of this application. The aforementioned storage media include: U disk, mobile hard disk, Read-Only Memory (ROM), Random Access Memory (RAM), magnetic disk or optical disk and other media that can store program code.

In some embodiments of the present disclosure, a processor-readable storage medium is further provided, where the processor-readable storage medium stores program instructions, and the program instructions are used to enable the processor to perform:

obtaining a first timestamp sent by a local service center (LSC) device and a second timestamp sent by a terminal, where the second timestamp is sent by the LSC device to the terminal, and the first timestamp and the second timestamp are sent by the LSC device based on an AP switching event or an AP switching request; when the first timestamp is consistent with the second timestamp, determining that the terminal is an access terminal of the target AP; or obtaining a second timestamp sent by a local service center (LSC) device and a first timestamp sent by a target access point (AP), where the first timestamp and the second timestamp are sent by the LSC device based on an AP switching event or an AP switching request; when the first timestamp is consistent with the second timestamp, determining that the target AP is an access AP of the terminal; or receiving a second access point (AP) switching request sent by a source AP, where the second AP switching request is configured to request the terminal to perform an AP switching; determining a target AP according to the second AP switching request, where the target AP is an AP to which the terminal is connected after the terminal performs the AP switching; sending a first timestamp to the target AP, and sending a second timestamp to the terminal.

The terminal device involved in the embodiments of this application may be a device that provides voice and/or data connectivity to users, a handheld device with a wireless connection function, or other processing devices connected to a wireless modem, etc. In different systems, the names of terminal equipment may also be different. For example, in a 5G system, the terminal equipment may be called User Equipment (UE). Wireless terminal equipment can communicate with one or more core networks (Core Network, CN) via a Radio Access Network (RAN). The wireless terminal equipment can be a mobile terminal equipment, such as a mobile phone (also known as a "cell phone") and computers with mobile terminal devices, which may be, for example, portable, pocket-sized, handheld, computer-built-in or vehicle-mounted mobile devices, which exchange speech and/or data with the radio access network. For example, Personal Communication Service (PCS) phones, cordless phones, Session Initiated Protocol (SIP) phones, Wireless Local Loop (WLL) stations, Personal Digital Assistants, PDA) and other equipment. Wireless terminal equipment may also be called a system, a subscriber unit, a subscriber station, a mobile station, a mobile station, a remote station, or an access point, remote terminal equipment (remote terminal), access terminal equipment (access terminal), user terminal equipment (user terminal), user agent, user device, are not limited in the embodiments of this application.

The network device involved in the embodiment of the present application may be a base station, which may include multiple cells providing services for the terminal. Depending on the specific application scenario, the base station may also be called an access point, or may be a device in the access network that communicates with the wireless terminal device through one or more sectors on the air interface, or other names. The network device may be used to interchange received air frames with Internet Protocol (IP) packets, and serve as a router between the wireless terminal device and the rest of the access network, where the rest of the access network may include an Internet Protocol (IP) communication network. The network device may also coordinate the attribute management of the air interface. For example, the network device involved in the embodiments of the present application may be a network device (Base Transceiver Station, BTS) in the Global System for Mobile communications (Global System for Mobile communications, GSM) or Code Division Multiple Access (Code Division Multiple Access, CDMA), or a network device (NodeB) in Wide-band Code Division Multiple Access (WCDMA), or an evolved network device (evolutional Node B, eNB or e-NodeB) in the Long Term Evolution (Long Term Evolution, LTE) system, a 5G base station (gNB) in the 5G network architecture (next generation system), or a Home evolved Node B (Home evolved Node B, HeNB), a relay node (relay node), a home base station (femto), a pico base station (pico), etc., which is not limited in the embodiments of the present application. In some network structures, the network devices may include a centralized unit (CU) node and a distributed unit (DU) node. The centralized unit and the distributed unit may also be arranged geographically separately.

Network devices and terminal devices can each use one or more antennas for multiple input multiple output (MIMO) transmission. MIMO transmission can be single user MIMO (SU-MIMO) or multi-user MIMO (MU-MIMO). Depending on the form and number of antenna combinations, MIMO transmission can be 2 Dimension MIMO (2 Dimension MIMO, 2D-MIMO), 3D MIMO (3Dimension MIMO, 3D-MIMO), Full Dimension MIMO (Full Dimension MIMO, FD-MIMO) or ultra-large-scale MIMO (massive-MIMO), it can also be diversity transmission, precoded transmission, or beamforming transmission, etc.

Those skilled in the art will appreciate that the embodiments of the present application may be provided as methods, systems, or computer program products. Therefore, the present application may take the form of a complete hardware embodiment, a complete software embodiment, or an embodiment combining software and hardware. Moreover, the present application may take the form of a computer program product implemented on one or more computer-usable storage media (including but not limited to disk storage and optical storage, etc.) containing computer-usable program codes.

The present application is described with reference to the flowcharts and/or block diagrams of the methods, devices (systems), and computer program products according to the embodiments of the present application. It should be understood that each process and/or box in the flowchart and/or block diagram, as well as the combination of the processes and/or boxes in the flowchart and/or block diagram, can be implemented by computer executable instructions. These computer executable instructions can be provided to a processor of a general-purpose computer, a special-purpose computer, an embedded processor, or other programmable data processing device to generate a machine, so that the instructions executed by the processor of the computer or other programmable data processing device generate a device for implementing the functions specified in one process or multiple processes in the flowchart and/or one box or multiple boxes in the block diagram.

These processor-executable instructions may also be stored in a processor-readable memory that causes a computer or other programmable data processing apparatus to operate in a particular manner, such that the generation of instructions stored in the processor-readable memory includes the manufacture of the instruction means product, the instruction device implements the function specified in one process or multiple processes in the flow chart and/or one block or multiple blocks in the block diagram.

These processor-executable instructions may also be loaded onto a computer or other programmable data processing device, causing a series of operational steps to be performed on the computer or other programmable device to produce computer-implemented processing, thereby causing the computer or other programmable device to The instructions that are executed provide steps for implementing the functions specified in a process or processes of the flowchart diagrams and/or a block or blocks of the block diagrams.

It should be noted that it should be understood that the division of each module above is only a division of logical functions. In actual implementation, it can be fully or partially integrated into a physical entity, or it can also be physically separated. These modules can all be implemented in the form of software calling through processing components; they can also all be implemented in the form of hardware; some modules can also be implemented in the form of software calling through processing components, and some modules can be implemented in the form of hardware. For example, the determination module can be a separate processing element, or can be integrated into a chip of the above device. In addition, it can also be stored in the memory of the above device in the form of program code, and can be processed by a certain processing element of the above device. Call and execute the functions of the above determined modules. The implementation of other modules is similar. In addition, all or part of these modules can be integrated together or implemented independently. The processing element described here may be an integrated circuit with signal processing capabilities. During the implementation process, each step of the above method or each of the above modules can be completed by instructions in the form of hardware integrated logic circuits or software in the processor element.

For example, each module, unit, sub-unit or sub-module may be one or more integrated circuits configured to implement the above method, such as one or more application specific integrated circuits (ASIC), or one or more digital signal processors (DSP), or one or more field programmable gate arrays (FPGA). For another example, when a module above is implemented in the form of a processing element scheduling program code, the processing element may be a general-purpose processor, such as a central processing unit (CPU) or other processor that can call program code. For another example, these modules may be integrated together and implemented in the form of a system-on-a-chip (SOC).

The terms "first", "second", etc. in the description and claims of the present disclosure are used to distinguish similar objects and are not necessarily used to describe a specific order or sequence. It is to be understood that the data so used are interchangeable under appropriate circumstances so that the embodiments of the disclosure described herein may be implemented, for example, in sequences other than those illustrated or described herein. In addition, the terms "including" and "having" and any variations thereof are intended to cover non-exclusive inclusions, e.g., a process, method, system, product, or apparatus that encompasses a series of steps or units and need not be limited to those explicitly listed. Those steps or elements may instead include other steps or elements not expressly listed or inherent to the process, method, product or apparatus. In addition, the use of "and/or" in the description and claims indicates at least one of the connected objects, such as A and/or B and/or C, indicating the inclusion of A alone, B alone, C alone, and both A and B. There are 7 situations in which both B and C exist, both A and C exist, and A, B, and C all exist. Similarly, the use of "at least one of A and B" in this specification and in the claims should be understood to mean "A alone, B alone, or both A and B present."

Obviously, those skilled in the art can make various changes and modifications to the present application without departing from the spirit and scope of the present application. In this way, if these modifications and variations of the present application fall within the scope of the claims of the present application and equivalent technologies, the present application is also intended to include these modifications and variations.

What is claimed is:

1. A device authentication method, comprising:
   obtaining, by a target access point (AP), a first timestamp sent by a local service center (LSC) device and a second timestamp sent by a terminal, wherein the second timestamp is sent by the LSC device to the terminal, and the first timestamp and the second timestamp are sent by the LSC device based on an AP switching event;
   when the first timestamp is consistent with the second timestamp, determining, by the target AP, that the terminal is an access terminal of the target AP;
   wherein prior to the obtaining by the target AP the first timestamp sent by the LSC device, the method further comprises:
   obtaining, by the target AP, a first AP switching request sent by the LSC device, wherein the first AP switching request is configured to request the terminal to switch from a source AP to the target AP;
   sending, by the target AP, verification information to the LSC device according to the first AP switching request;
   wherein the first timestamp is sent to the target AP after the LSC determines that the target AP is a licit AP according to the verification information;
   wherein the verification information comprises identification information of the target AP and password information corresponding to the identification information;
   prior to the obtaining by the target AP the first AP switching request sent by the LSC device, the method further comprises:
   sending the identification information and a public-key certificate to the LSC device;
   obtaining the password information corresponding to the identification information sent by the LSC, wherein the password information is encrypted through the public-key certificate.

2. The method according to claim 1, further comprising:
   sending the first timestamp to the terminal.

3. A device authentication apparatus, applied to a target access point (AP), comprising a memory, a transceiver, and a processor;
   the memory is configured to store a computer program; the transceiver is configured to send and receive data under a control of the processor; and the processor is configured to read the computer program in the memory to perform the device authentication method according to claim 1.

4. The apparatus according to claim 3, wherein the verification information comprises identification information of the target AP and password information corresponding to the identification information;
   the processor is further configured to execute the program to perform:
   sending, by the transceiver, the identification information and a public-key certificate to the LSC device;
   obtaining, by the transceiver, the password information corresponding to the identification information sent by the LSC, wherein the password information is encrypted through the public-key certificate.

5. The apparatus according to claim 3, wherein the processor is further configured to execute the program to perform:
   sending, by the transceiver, the first timestamp to the terminal.

6. A device authentication method, comprising:
   obtaining, by a terminal, a second timestamp sent by a local service center (LSC) device and a first timestamp sent by a target access point (AP), wherein the first timestamp and the second timestamp are sent by the LSC device based on an AP switching event;
   when the first timestamp is consistent with the second timestamp, determining, by the terminal, that the target AP is an access AP of the terminal;
   wherein the method further comprises:
   sending the second timestamp to the target AP;
   sending, by the target AP, verification information to the LSC device according to the first AP switching request;
   wherein the first timestamp is sent to the target AP after the LSC determines that the target AP is a licit AP according to the verification information;
   wherein the verification information comprises identification information of the target AP and password information corresponding to the identification information;
   the method further comprises:
   sending the identification information and a public-key certificate to the LSC device;
   obtaining the password information corresponding to the identification information sent by the LSC, wherein the password information is encrypted through the public-key certificate.

7. A device authentication apparatus, applied to a terminal, comprising a memory, a transceiver, and a processor;
   the memory is configured to store a computer program; the transceiver is configured to send and receive data under a control of the processor; and the processor is configured to read the computer program in the memory to perform the device authentication method according to claim 6.

8. A device authentication method, comprising:
   receiving, by a local service center (LSC) device, a second access point (AP) switching request sent by a source AP, wherein the second AP switching request is configured to request the terminal to perform an AP switching;
   determining, by the LSC device, a target AP according to the second AP switching request, wherein the target AP is an AP to which the terminal is connected after the terminal performs the AP switching;
   sending, by the LSC device, a first timestamp to the target AP, and sending a second timestamp to the terminal;
   wherein the sending by the LSC device the first timestamp to the target AP comprises:
   sending a first AP switching request to the target AP, wherein the first AP switching request is configured to request the terminal to switch from the source AP to the target AP;
   obtaining verification information sent by the target AP according to the first AP switching request;

when determining that the target AP is a licit AP according to the verification information, sending the first timestamp to the target AP;

wherein the verification information comprises identification information of the target AP and password information corresponding to the identification information;

the method further comprises:

obtaining a hash value corresponding to the password information, according to the password information and a random number;

if the hash value is consistent with a hash value corresponding to the identification information stored in a database, determining that the target AP is a licit AP;

wherein prior to the sending the first AP switching request to the target AP, the method further comprises:

obtaining identification information of the target AP and a public-key certificate sent by the target AP;

after verifying the identification information through the public-key certificate, generating password information corresponding to the identification information;

sending the password information to the target AP, and generating and storing a hash value corresponding to the identification information according to the password information and a random number.

9. The method according to claim 8, wherein the determining the target AP comprises:

determining a switching AP corresponding to a switching time of the terminal as the target AP, according to an AP switching list;

wherein switching APs corresponding to different switching time are stored in the AP switching list.

10. A device authentication apparatus, applied to a local service center (LSC) device, comprising a memory, a transceiver, and a processor;

the memory is configured to store a computer program; the transceiver is configured to send and receive data under a control of the processor; and the processor is configured to read the computer program in the memory to perform the device authentication method according to claim 8.

11. The apparatus according to claim 10, wherein the processor is further configured to execute the program to perform:

determining a switching AP corresponding to a switching time of the terminal as the target AP, according to an AP switching list;

wherein switching APs corresponding to different switching time are stored in the AP switching list.

\* \* \* \* \*